United States Patent [19]
Wooldridge

[11] Patent Number: 6,120,085

[45] Date of Patent: Sep. 19, 2000

[54] DEPLOYABLE ANTIGLARE SCREEN DEVICE FOR DRIVERS

[76] Inventor: John Wooldridge, 811 W. Oak, Herrin, Ill. 62948

[21] Appl. No.: 09/239,456

[22] Filed: Jan. 28, 1999

[51] Int. Cl.[7] ........................................................ B60J 3/00
[52] U.S. Cl. ........................ 296/97.8; 296/97.9; 296/97.7; 296/97.4
[58] Field of Search ................................ 296/97.1, 97.2, 296/97.4, 97.8, 97.9, 97.7, 97.12, 97.13

[56] References Cited

U.S. PATENT DOCUMENTS

| | | | |
|---|---|---|---|
| 1,180,589 | 4/1916 | Kubat | 296/97.9 |
| 1,454,498 | 5/1923 | Whall et al. | 296/97.9 |

(List continued on next page.)

OTHER PUBLICATIONS

Ward's Auto World Oct. 1997 v33, n10, p71(3), ISSN: 0043–0315 "Suppliers do their part: '98 models are loaded with supplier innovations", T. Murphy, B. Visnic.
Ward's Auto World Aug. 1995 v31, n8, p45(2), ISSN: 0043–0325 "The Switch is to prevention; once far–out safety ideas could be commonplace soon.", J. Crone.
Popular Science Dec. 1996 v249, n6, p45(25), ISSN: 0161–7370, Author: M. DiChristina "The Ninth Annual Best of What's New: the year's 100 greatest achievements in science & technology".
Aftermarket Business Jun. 1, 1993 p. 8, ISSN: 0892–1121 Donnelly: New auto vision technology detects glare, dims mirrors.
Popular Science(GPOS) Dec. 1993 v243, n6, p23, ISSN: 0161–7370 "Canceling glare". Author: J. Shine.
Ward's Auto World Apr., 1993 v29, n4, p41(3), ISSN: 0043–0315, Plumb, Smith, Sorge, Winter Big show attracts 39,000 an array of new products. (Society of Auto. Eng. Int. Congress & Exposition.
Design News Nov. 15, 1993 P. 25, ISSN: 0011–9407, "In search of 'smart glass': . . New smart glass allows truckers to dim all 3 vehicle mirrors independently to reduce glare".
PR Newswire Mar. 1993 p. 1, "Donnelly Introduces Revolutionary New Automotive....Vision Tech System: Intelligent Vision System Eliminates Headlight Glare".

*Primary Examiner*—D. Glenn Dayoan
*Assistant Examiner*—Patricia Engle

[57] ABSTRACT

An improved portable antiglare screen device to be used by the driver of an automobile in combination with an exterior rear view mirror in order to prevent glare to the driver when viewing therethrough. This antiglare screen device detachably mounts onto the upper inboard side of a drivers side door, adjacent a slidable window within the door, and directly opposite the exterior rear view mirror. This antiglare screen device has a base comprising a housing and two integral mounting clips. These mounting clips are wedged down in between the slidable window and elastomeric window seal on the inboard side of the door, adjacent the slidable window, to hold the housing in place after quick installation. A manually operable mechanism, mounted within the housing, provides a collapsible framework device, comprising a duality of elongated support members, to deploy a flexible one-ply mesh. This mesh can be spread within the drivers line-of-sight of his/her exterior rear view mirror, encompassing its perimeter, for viewing the image of trailing vehicles therethrough and attenuating undue glare from the bright headlights of those vehicles. This one-ply mesh can also be retracted by the mechanism back into the housing of the base for storage and can be repeatedly deployed or retracted by the driver with one simple flick of the wrist of one hand.

15 Claims, 6 Drawing Sheets

U.S. PATENT DOCUMENTS

| | | | |
|---|---|---|---|
| 1,920,185 | 8/1933 | Carr, Jr. | 296/97.7 |
| 1,953,877 | 4/1934 | Chase | 248/205.5 |
| 2,261,301 | 4/1941 | Smith | 248/479 |
| 2,594,813 | 4/1952 | Seibert | 160/120 |
| 2,665,166 | 1/1954 | Roark | 296/97.9 |
| 2,962,721 | 12/1960 | Epsy | 296/97.7 X |
| 3,022,109 | 2/1962 | Hauskama | 296/97.7 |
| 3,025,098 | 3/1962 | Andrews | 296/152 |
| 3,410,602 | 11/1968 | Schuler | 296/97.6 |
| 3,412,506 | 11/1968 | Shiota | 49/82.1 |
| 3,415,569 | 12/1968 | Leevo | 296/97.6 |
| 3,454,301 | 7/1969 | Lehmann | 296/97.8 |
| 3,518,417 | 6/1970 | Cotterill | 378/36 |
| 3,948,554 | 4/1976 | Barbee | 296/97.6 |
| 4,023,856 | 5/1977 | DeRees | 296/97.9 |
| 4,130,317 | 12/1978 | Lai | 296/97.9 |
| 4,261,649 | 4/1981 | Richard | 296/97.7 X |
| 4,527,860 | 7/1985 | Roof | 359/606 |
| 4,527,861 | 7/1985 | Van Duyn | 359/606 |
| 4,560,251 | 12/1985 | Murjahn | 359/608 |
| 4,684,216 | 8/1987 | Neumann | 359/604 |
| 4,818,011 | 4/1989 | Cherian | 296/97.2 |
| 4,865,421 | 9/1989 | Lu et al. | 359/608 |
| 4,921,296 | 5/1990 | Gruber | 296/97.2 |
| 4,943,103 | 7/1990 | Rosen | 296/97.1 |
| 5,022,701 | 6/1991 | Thompson, II | 296/97.1 X |
| 5,089,912 | 2/1992 | Simin | 359/608 |
| 5,179,471 | 1/1993 | Caskey et al. | 359/603 |
| 5,252,997 | 10/1993 | Christenbery | 351/49 |
| 5,450,246 | 9/1995 | Jain | 359/877 |

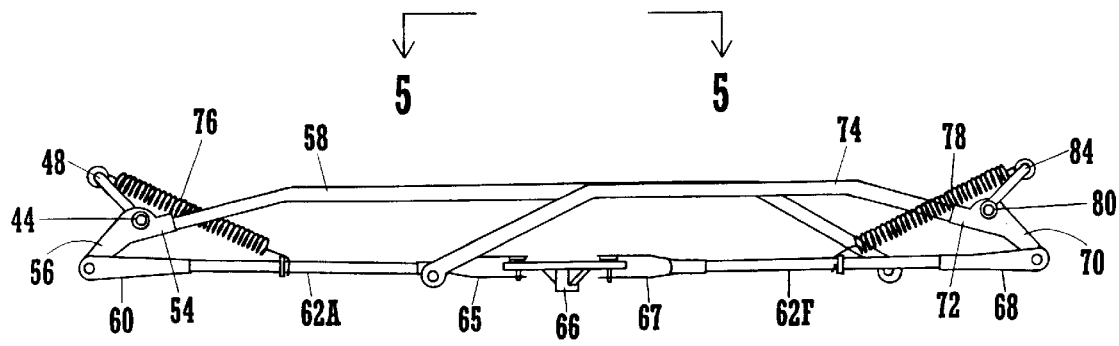
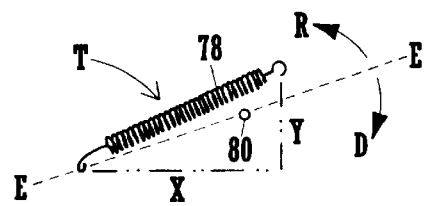
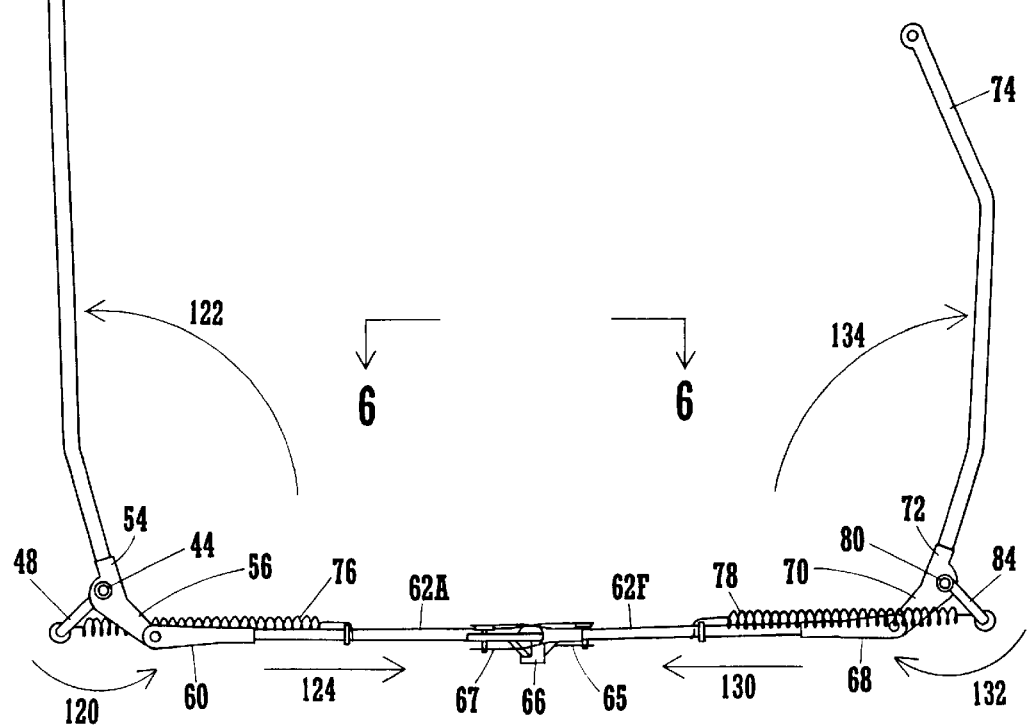
Fig. 3
Fig. 3A
Fig. 4

DEPLOYABLE ANTIGLARE SCREEN DEVICE FOR DRIVERS

BACKGROUND

Field of Invention

This invention relates generally to glare screens/shields which diminish glare reflected from rear view mirrors, and more specifically to glare screens/shields which diminish glare from exterior rear view mirrors located on the driver's side of automobiles.

Discussion of Problem that Invention Addresses

Glare from the head lights of trailing vehicles, reflected from an automobile's rear view mirrors, is not only a common annoyance to drivers, but also a potential hazard. Safety becomes an important issue when the eye is subjected to glare during nighttime driving. In fact, research recently completed by Michigan's Ferris State University College of Optometry shows that stopping distances may be increased by as much as 100 feet at 60 m.p.h. when a driver is subjected to headlight glare at night. Glare causes an "after image" on the eye's retina, impeding the driver's ability to see and react to objects in the vehicle's path. The "after image" remains on the retina for several minutes, increasing the driver's reaction time, and creating an unsafe driving environment.

Studies also show that headlight glare at night increases driver fatigue. This is an important finding since the increasing traffic on our roadways, due to increased population, will naturally increase the incidence of head light glare. It is entirely possible that along with fatigue, headlight glare may also cause a driver to become irritated and, in isolated cases, could even trigger a road-rage incident. Now, while human psychology is not within the scope of the present invention, it is within the context of its intended function. That function is simply to make night driving a safer experience and, perhaps, a little more enjoyable.

Discussion of Prior Art

In order to minimize reflected glare, interior rear view mirrors are commonly equipped with some mechanism to reduce the glare associated with headlights from a trailing vehicle. This usually consists of a toggle switch that shifts a prismatic mirror between the two positions of a regular reflection and a dimmed reflection to prevent glare. One interior rear view mirror which has a nonglare option is described in U.S. Pat. No. 4,527,860 issued Jul. 9, 1985 to James A. Roof. A mirror such as this effectively solves the problem of headlight glare reflected from the interior rear view mirror.

Unfortunately, this type of prismatic mirror, is not effective for use as an exterior rear view mirror. The draw back of this design is that a prismatic mirror, mounted on the exterior of an automobile, would tend to produce ghost images which are visible to the driver in the face of that mirror.

There have been numerous attempts to prevent blinding glare which is reflected by exterior rear view mirrors. One example appeared in the USA Today newspaper on Wednesday, Nov. 8, 1989. It was an advertisement on page 8D that read "You'll never be blinded from the back again!", relating to a device called GLAREBUSTERS, which is similar to the present invention in that its intended function is to decrease headlight glare of vehicles approaching from behind. GLAREBUSTERS night driving shields comprise a two unit set, each part of which comprises a tinted plate of DuPont LUCITE and a plurality of suction cups to removably attach the plate to a car window. This same design is described in U.S. Pat. No. 4,943,103 issued Jul. 24, 1990 to John B. Rosen. Although this type of shield may serve to reduce headlight glare, one problem is that of it not being large enough to block the glare if the driver shifts positions relative to the GLAREBUSTERS. The main concern however is that this device, once mounted, gives only a nonglare, "dimmed" view of the moving vehicles behind. So, if the driver of a vehicle from behind is, for the moment, using low-beam headlights, and those headlights are properly adjusted, then the image of that vehicle's lights may be unnecessarily dark in the exterior rear view mirror of the driver of a leading vehicle. This situation could cause a miscalculation in distance or, even worse, it could possibly obscure the drivers vision to the point of him/her not being aware of an approaching vehicle. Simply stated, it is extremely important that any device which is used to prevent headlight glare reflected from the rear view mirrors of a motor vehicle, should be switchable between a normal reflection and a nonglare reflection. In addition, such a device should be easily switchable with one quick motion that does not divert a drivers attention from the road.

Another anti-glare shield similar to the present invention is described in U.S. Pat. No. 4,560,251 issued Dec. 24, 1985 to Waldemar Murjahn. This patent discloses an antiglare shield for exterior rear view mirrors which comprises an antiglare sheet, a stop, and a section which fits in an interior section of a vehicle's window shaft. This antiglare shield covers a larger area than does the GLAREBUSTERS, and has a part of the shield wedged into the window shaft. This design is very similar to U.S. Pat. No. 4,921,296 issued May 1, 1990 to Carl A. Gruber. Neither of these glare shields are integral to the car. More importantly, neither are switchable from nonglare to the regular reflected image which is normally seen in the exterior rear view mirror. As stated above, this is a definite disadvantage of these designs.

French patent 2,500,795 issued to Jean-Claude Tamagna and U.S. Pat. No. 4,865,421 issued Sep. 12, 1989 to Chih-Hsiung Lu and Jill Hui-Ju Lu are two patents which disclose very similar antiglare shield designs. Both designs comprise a plate of antiglare material which is installed and stored in a car door's window shaft, on the interior side of the window, in such a way that it may be rotated within a driver's line-of-sight of his/her exterior rear view mirror. This device is pivoted at a front edge and can be rotated into and out of position, when required, as easily as one would toggle the interior rear view mirror into and out of its nonglare mode. One problem with this device, however, is that it needs a large space in the interior of the window shaft to be stored properly. This means that car doors would have to be designed and built to accommodate this device. Unfortunately, car makers are unlikely to go to the extra trouble and expense, which regrettably renders this design impractical.

U.S. Pat. No. 5,089,912 issued Feb. 18, 1992 to Gerald L. Simin describes a retractable antiglare shield for an exterior rear view mirror that is mounted in a vehicle door and includes a flexible shield which can be stored in the door when not in use. This shield is supported on a roller mechanism and has its upper end formed with a support member which is insertable between the window and the door frame for maintaining the shield in the operative raised position. This particular design would have to be built into the door by auto makers before becoming available to the general public. The roller mechanism would seem to be prone to malfunction after initial use, as it resembles an up-side-down window blind commonly seen in homes, and would most probably be subject to the same misalignment problems. In addition, moving this shield between its operative and its retracted positions, aside from being somewhat clumsy, would require too much manual manipulation to make it a safe operation while driving. Once again, here is a device that can not be switched back and forth easily to provide both a regular view and a nonglare view of the image seen in an automobile's exterior rear view mirror.

Additional Background—Related Prior Art

A related device to that of the present invention is disclosed in U.S. Pat. No. 5,252,997 issued Oct. 12, 1993 to Charles R. Christenbery and describes a device that relates broadly to vision wear such as eyeglasses or sunglasses, which is more particularly a visual aid to be worn during nighttime driving. This visual aid has a glare reduction arrangement on both lens of the "eyeglasses". Though this type of device may well reduce glare to the night-driver, it may also impede the drivers view or cause an annoying eye strain that could lead to driver fatigue.

Another related device is described in U.S. Pat. No. 5,179,471 issued Jan. 12, 1993 to Gregory Caskey, Rodney Arendsen, and Niall Lynam. In essence, this device is a spectrally selective, glare-reducing mirror for vehicles. This is a high-tech answer to nonglare mirrors for both interior and exterior rear view mirrors in automobiles. Similar mirror called Electrochromic rearview mirrors are associated with the Gentex corporation. These automatic nonglare rear view mirrors would seem to be a superior way to solve glare problems for drivers. The drawback, however is that not only are they expensive, but also available on only a very few high-end vehicles. These mirrors can not be purchased and installed as after market items in a driver's present vehicle. And although these mirrors may become more readily available in a wider variety of new automobiles in the future, it will be several years distant. Even then, it would take many more years for the older model vehicles, still on the road, to be phased-out and replaced by the newer vehicles, equipped with this particular technology. This phase-in would happen only gradually. In short, advanced as it is, this technology will be a long time coming for the average consumer.

Other vehicles window glare shields and screens are disclosed by U.S. Pat. Nos. 1,180,589 Kubat; 1,454,498 Whall et al.; 1,920,185 Carr, Jr.; 1,953,877 Chase; 2,261,301 Smith; 2,594,813 Seibert; 2,665,166 Roark; 3,025,098 Andrews; 3,410,602 Schuler; 3,412,506 Masayoshi Shiota; 3,415,569 Leevo; 3,454,301 Lehmann; 3,518,427 Cotterill; 3,948,554 Barbee; 4,023,856 DeRees; and 4,130,317 Lai, 2,962,721 Epsy, 3,022,109 Hauskama, 4,261,649 Richard, 5,022,701 Thompson, II.

OBJECTS AND ADVANTAGES

Accordingly, several objects and advantages of the present invention are as follows:

a) to be used by the driver of an automobile, in combination with his/her exterior rear view mirror, to prevent (lower the intensity of) reflected glare from the bright headlights of a trailing vehicle.

b) to be a glare screen that can be deployed and then retracted repeatedly without distracting the driver.

c) to be deployed or retracted with one quick and easy movement.

d) to be purchased as an after-market item totally independent of any vehicles it will be used in.

e) to be inexpensive to manufacture, well suited for easy shipment and distribution, and small enough to take up little shelf space in a warehouse or retail store. This would result in an expensive and readily accessible item for consumers.

f) to be consumer ready for easy self-installation within seconds, eliminating any need for middle men, mechanics, or service specialists.

g) to be lightweight, portable, and easily stowed when not in use.

h) to be used primarily at night but can also be used during early and late day light hours for attenuating low angle sun light.

i) to be transferable from one automobile to another.

j) to be an antiglare screen that can collapse or fold into a small and compact space when retracted, and yet be capable of stretching into a large enough shape, when deployed, to completely enshroud the driver's view of his/her exterior rear view mirror. Further, the antiglare screen will cut out bright glare, yet allow enough light through so a driver will continue to see the image of headlights from behind and be able to keep track of a trailing vehicle's position.

Further objects and advantages of my invention will become apparent from a consideration of the drawings and ensuing description.

DRAWING FIGURES

FIG. 3 is a separate side view of the mechanism component, when retracted.

FIG. 3A is an imaginary right triangle to be used in conjunction with FIG. 3 in order to show the proper positioning of an extension spring while the mechanism is retracted as shown in FIG. 3.

FIG. 4 is a separate side view of the mechanism of the present invention in its deployed position and should be used in combination with FIG. 3 to show movement of the mechanism.

REFERENCE NUMERALS AND LETTERS IN DRAWINGS

Figure 1:
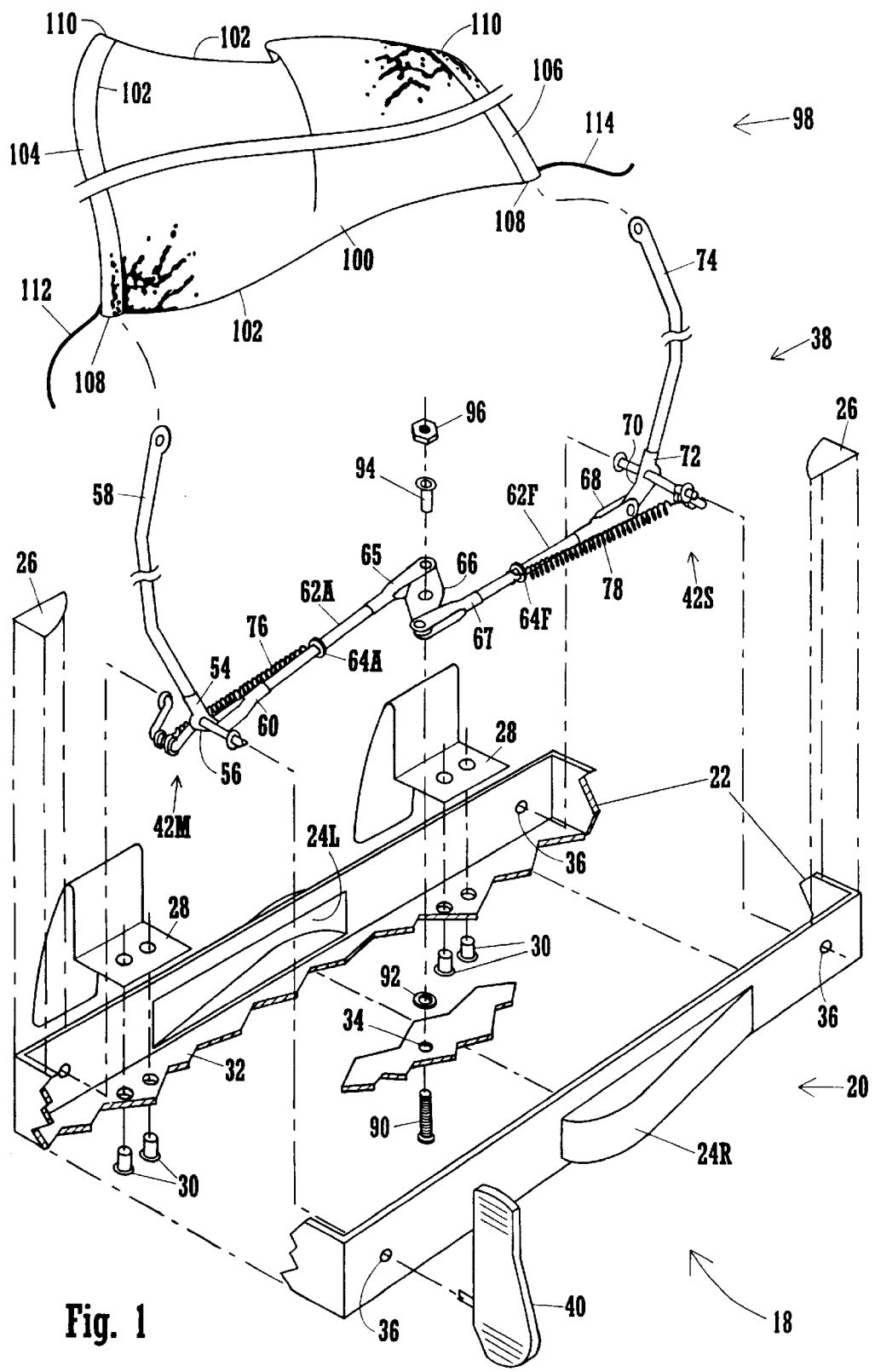
FIG. 1 is an exploded, perspective view of a deployable antiglare screen device according to the present invention. It is a complete overview upon which separate components, and their relation to each other, can be based in subsequent FIGS. 2 through 7.

| 18 Deployable Antiglare Screen Device For Drivers | |
|---|---|
| 20 base unit | |
| 22 housing | 24R right nacelle |
| 24L left nacelle | 26 top-end covers (two) |
| 28 mounting clips (two) | 28A apex |
| 28C rounded corners | 28R mounting clip holes |
| 2BN interior flank | 28X exterior flank |
| 30 rivets (four) | 32 housing floor |
| 34 central floor hole | 36 side holes (four) |
| 38 manually engaging mechanism | |
| 40 hand lever with striated grips | 42M master rotation device |
| 42S slave rotation device | 44 rear arbor* |
| 46 arbor end-stops (two)* | 48 crank arm (rear)* |
| 50 splines* | 52 flute* |
| 54 collar | 56 appendage/finger |
| 58 long arm | 60 clevis |
| 62A aft connecting rod | 62F fore connecting rod |
| 64A aft spring attachment | 64F fore spring attachment |
| 65 clevis | 66 bell crank |
| 67 clevis | 68 clevis |
| 70 appendage/finger | 72 collar |
| 74 short arm | 76 aft extension spring |
| 78 fore extension spring | 80 front arbor** |
| 82 arbor end-stops (two)** | 84 crank arm (front)** |
| 86 splines** | 88 flute** |
| 90 bolt | 92 spacing washer |
| 94 bushing | 96 nut |
| 98 fabric structure | |
| 100 one-ply elastic mesh screen | 102 seam |
| 104 rear sleeve | 106 front sleeve |
| 108 open bottom end | 110 closed top-end |
| 112 rear tie-down cord | 114 front tie-down cord |
| 116 individual threads (nylon/spandex) | 118 voids between threads |
| 120 arrow showing 90° rotation | 122 arrow of long arm rotation |
| 124 arrow of horizontal movement | 126 arrow showing ¼ rotation |
| 128 arrow showing ¼ rotation | 130 horizontal movement arrow |
| 132 arrow showing 90° rotation | 134 short arm rotation arrow |
| 136 incoming light arrows | 138 outgoing light arrows |
| 140 inboard side of door | 142 slidable side window |
| 144 exterior rear-view mirror | 146 steering wheel |
| 148 wind shield | 150 interior window seal |
| 152 exterior side of door | 154 exterior window seal |
| 156 a person's thumb | 158 a person's index finger |
| 160 a person's left hand | 162 arrow showing 90° rotation |
| 164 arrow showing 90° rotation | 166 arrow showing 90° rotation |
| 168 arrow showing 90° rotation | 170 one hand of a person |
| D arrow (direction to deploy) | E--E line of equilibrium |
| R arrow (direction to retract) | T imaginary right triangle |
| X abscissa | Y ordinate |

*sub-part of master rotation device 42M
**sub-part of slave rotation device 42S

SUMMARY

In accordance with the present invention, a portable antiglare screen device comprises a flexible fabric screen structure that is stored in a housing of a base, and can be alternately deployed from or retracted back into this housing via a mechanism mounted within the housing. The base can be easily installed in the passenger section of a motor vehicle on an inboard side of a drivers side door, adjacent a slidable side window, and positioned so the flexible fabric structure, when deployed, is within a drivers line-of-sight of, and encompasses the perimeter of his/her exterior rear view mirror to attenuate reflected headlight glare when viewing therethrough.

DESCRIPTION OF FIGS. 1 TO 17

FIG. 1 shows an exploded view of the deployable antiglare screen device 18. The three main sections are a base 20 which serves as a protective external shell and mounting platform for a mechanism 38 with an attaching fabric structure 98.

The base 20 comprises a housing 22 with a nacelle 24R on the nearest or right hand side, a nacelle 24L (interior view) on the opposite or left hand side, two top-end-covers 26, two mounting clips 28 fastened with four rivets 30 to a housing floor 32, a central floor hole 34, and four side holes 36 to mount mechanism 38.

The main parts of mechanism 38 comprises a hand lever (with striated finger grips) 40, a master rotation-device 42M with a fixedly attached collar or cincture 54 and an appendage or finger 56 (partially hidden in this view), a long arm 58 mounted to collar 54, an aft connecting rod 62A with attached clevises 60 and 65, and aft spring-attachment 64A, a bell crank 66, a fore connecting rod 62F with attached clevises 67 and 68, a fore spring attachment 64F, a slave rotation-device 42S with a fixedly attached collar or cincture 72 and an appendage or finger 70, a short arm 74 mounted to collar 72, and two extension springs 76 and 78.

The bell crank 66 is mounted to the housing floor 32 through floor hole 34 with a bolt 90, a spacing washer 92, a bushing 94, and a nut 96. Master rotation-device 42M and slave rotation device 42S fit into side holes 36 of housing 22. Hand lever 40 is adjoined to Master rotational-device 42M.

Fabric structure 98 comprises a sheer one-ply elastic mesh 100 made from a combination of nylon and spandex, bordered on all four sides by a seam 102 serving both as reinforcement and as a means to attach a long sleeve 104 and a short sleeve 106, sewn on opposite ends, each with an open bottom end 108 and a closed top end 110, the long sleeve 104 having a tie-down-cord 112, and the short sleeve 106 having a tie-down-cord 114.

Note that if the left side of housing 22, along with integral left nacelle 24L, was rotated longitudinally 180° (180 degrees) about a centrally located vertical axes, it would look identical to the right side of the housing 22, with its integral right nacelle 24R. This shows that each of the two sides can be formed from the same mold, and then assembled around mechanism 38 in a head-to-toe fashion.

Housing 22 can be made by injection molding of any number of polymers in either their native form or as combinations (alloys). The most likey choices would be polyethylene, polypropylene, PVC, or ABS. Light-weight metals such as aluminum alloy may also be used, although shipping weight considerations may make even light-weight metals an undesirable choice to manufacturers for this component.

Figures 1A, 2:
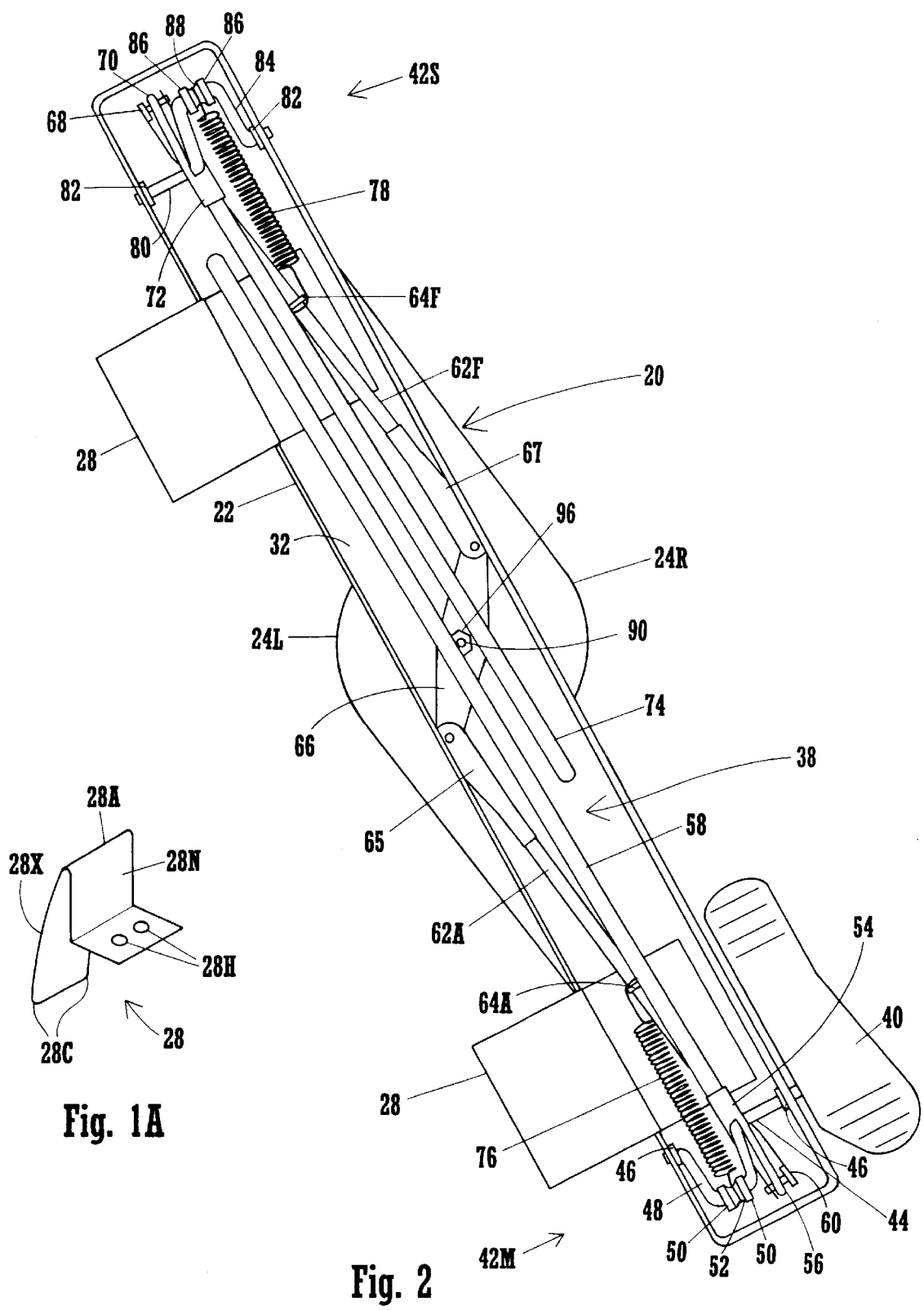
FIG. 1A is a more indepth look at one of two identical mounting clips shown in FIG. 1.
FIG. 2 is a top view of the rigid components of the antiglare screen device which includes a retracted mechanism, a housing, and the two mounting clips.

FIG. 1A is a more detailed look at one of the two identical mounting clips 28. Each mounting clip 28 has a substantially anticlinal shape with a half-arch-shaped exterior flank 28X, having rounded corners 28C, and an "L" shaped interior flank 28N on the side opposite, both culminating into an apex 28A at the upper end, with the "L" shaped interior flank 28N having two holes 28H for mounting onto housing floor 32 with rivets 30, both of which are previously shown in FIG. 1. Materials used to make mounting clips 28 should have ductile and malleable properties such as those found in aluminum or an aluminum alloy which can be hammered or pressed into thin sheets and still retain suitable strength and durability. A polymer may also be used provided it has suitably ductile and malleable qualities as determined by those skilled in the art.

FIG. 2 shows a more detailed top view of mechanism 38 retracted within the housing 22 of base 20, although the two top end-covers 26 (shown in FIG. 1) have been omitted to allow a clear view of those parts that would otherwise be obscured. Examining base 20 shows the housing 22, housing floor 32, the integral nacelles 24L and 24R, and the two mounting clips 28 that are attached by rivets 30 (shown in FIG. 1 but not seen here as they are hidden from view beneath mechanism 38).

Mechanism 38 shows hand lever 40 adjoined to the master rotation-device 42M comprising a rear arbor 44 that has two arbor end-stops 46, one at each of its two ends to prevent side-to-side movement, and a built-in crank arm 48 with two integral splines 50 which are spaced to form a flute 52. Collar 54 and appendage 56 are fixedly attached near the center of rear arbor 44, adjacent to its crank arm 48 and at a perpendicular angle to its axis of rotation. Long arm 58 is snugged into collar 54 and fixedly attached there with solder and/or crimping. Appendage 56 attaches to aft connecting rod 62A with clevis 60. The aft connecting rod is attached, on its opposite end, to the left wing of bell crank 66 with clevis 65. Bolt 90 and nut 96 are two of the joining elements that rotatably attach bell crank 66 to housing 22. Fore connecting rod 62F attaches to the right wing of bell crank 66 with clevis 67 and attaches to appendage 70 with clevis 68. Appendage 70 is fixedly attached to slave rotation device 42S, which comprises a front arbor 80 that has two arbor end stops 82, one at each of its two ends which prevent side-to-side movement, and a built-in crank arm 84 with two splines 86 spaced to form a flute 88. Appendage 70 and collar 72 are fixedly attached near the center of front arbor 80 adjacent to its crank arm 84 and at a perpendicular angle to its axis of rotation. Short arm 74 is snugged into collar 72 and fixedly attached there with solder and/or crimping. Aft extension spring 76 is hooked around flute 52 on one end, and to aft spring attachment 64A on the other. Fore extension spring 78 is hooked around flute 88 on one end, and to fore spring attachment 64F on the other. Both extension springs 76 and 78 are under slight tension when mechanism 38 is in this retracted position.

Mechanism 38 should be made from a suitable metal, such as aluminum alloy or cold-rolled steel. Arms 58 and 74 can be made from an aluminum alloy similar to that used in the making of bicycle wheel spokes. Parts which are fixedly attached to each other can be molded integrally. Master rotation device 42M and slave rotation device 42S, although mounted in opposite directions to each other, are identical and as such can be formed from the same production tooling. Connecting rods 62A and 62F can also be made from the same tooling. Using this method will keep initial manufacturing expenditures to a minimum.

CONFIGURATION OF MOVING PARTS—FIGS. 3 TO 6

FIG. 3 and FIG. 4 are side views that combine to show how mechanism 38 moves from a retracted or folded-down position, in FIG. 3, to a fully deployed position, in FIG. 4. Note that hand level 40 (previously shown in FIGS. 1 and 2) has been omitted from FIGS. 3 & 4 in order to allow an unobstructed view of those parts and their movements that would otherwise be obscured. Also note that radiating out perpendicularly from arbor 44 are crank arm 48 and appendage 56, approximately quadrantal each other, and collar 54 which conforms with the entrance angle of long arm 58. In addition, radiating out perpendicularly from arbor 80 are crank arm 84 and appendage 70, approximately quadrantal each other, and collar 72 conforming with the entrance angle of short arm 74.

Alternating now between FIGS. 3 and 4, shows rear arbor 44, crank arm 48, fixedly attached collar 54, and appendage 56 all rotating as one piece approximately 90° as indicated by arrow 120 (of FIG. 4). As collar 54 rotates, attached long arm 58 also rotates 90° up and out from a horizontal to a vertical position as shown by arrow 122 (in FIG. 4). Aft connecting rod 62A which is connected to appendage 56 by clevis 60 is thrust forward, as indicated by arrow 124 and extension spring 76 is stretched. At this juncture, refer to lines 5—5 and 6—6, which represent FIGS. 5 and 6 respectively.

Figure 5:
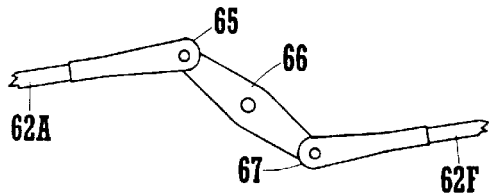
FIG. 5 is a top view of the portion indicated by the section lines 5—5 in FIG. 3.
Figure 6:
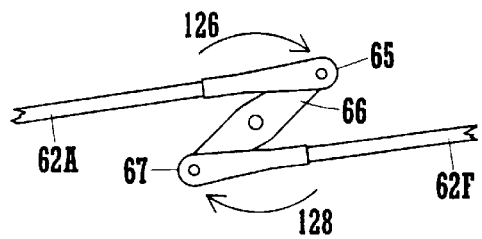
FIG. 6 is a top view of the portion indicated by the section lines 6—6 in FIG. 4, and should be used in combination with FIG. 5 to understand movement of this portion.

FIGS. 5 and 6 are top views that help show more clearly the movement of mechanism 38 in proximity to bell crank 66. Using these two figures in combination with FIGS. 3 and 4, demonstrates how aft connecting rod 62A and fixedly attached clevis 65 pushes the left wing of bell crank 66, which rotates approximately one quarter turn, indicated by arrow 126 (in FIG. 6), and rotates the opposite side of bell crank 66 approximately one quarter turn, as shown by arrow 128 (also in FIG. 6), which pulls clevis 67 and its fixedly attached fore connecting rod 62F backward, as shown by arrow 130 (in FIG. 4). Note that long arm 58 and short arm 74, shown in FIG. 3, have been omitted from FIG. 5 in order to clearly show the underlying parts they would otherwise partially obscure.

Continuing now with only FIGS. 3 and 4, when fore connecting rod 62F is pulled backward, extension spring 78 is stretched. In addition, fore connecting rod 62F, with its fixedly attached clevis 68, pulls on and rotates as one piece appendage 70, its fixedly attached collar 72, front arbor 80, and crank arm 84, as shown by arrow 132 (in FIG. 4). As collar 72 rotates approximately 90°, so too does short arm 74, from a horizontal to a vertical position as shown by arrow 134 (FIG. 4).

Now, in order to more fully understand the workings of mechanism 38, it is necessary to examine more closely the two extension springs 76 and 78, their position, and their movement relative to the pivotal axes of respective arbors 44 and 80. Both springs are identical in length and similar in positioning and movement, so it is necessary only to focus on one in order to understand both. Referring first to FIG. 3, observe the apparent length and angle of inclination of extension spring 78 and how it relates generally in position to the pivotal axis of arbor 80.

Now in FIG. 3A we can designate extension spring 78 as the hypotenuse of an imaginary right triangle T, with an abscissa X, to show horizontal length, and an ordinate Y, to show vertical height. So the hypotenuse, which is extension spring 78, abscissa X, and ordinate Y are simply the component sides of imaginary right triangle T. Now it becomes a simple matter to see that when the pivotal axis of arbor 80 is well within the perimeter of triangle T, then spring 78, if under slight tension, is in the proper position when mechanism 38 is retracted (as shown in FIG. 3).

FIG. 3A further shows that when extension spring 78 is in its retracted position, as shown here, and under slight tension as required, the spring will exert a rotational force or torque in the direction of arrow R to keep mechanism 38 retracted (as shown in FIG. 3). FIG. 3A also shows an imaginary line-of-equilibrium E—E representing the theoretical place where extension spring 78, when lying along this line, will exert no rotational force on arbor 80. Above line E—E, as pictured, extension spring 78 forces arbor 80 to rotate toward retraction, represented by arrow R, and will cause mechanism 38 (shown in FIG. 3) to be in its retracted position. If spring 78 moves below imaginary line E—E, the torque direction will reverse, and cause arbor 80 to rotate in a direction to deploy, shown by arrow D which would cause mechanism 38 (shown in FIG. 4) to be in its deployed position.

The exercise of FIG. 3A, using imaginary triangle T to illustrate extension spring 78 and its placement relative to arbor 80, can also be applied to extension spring 76 and arbor 44, shown in FIG. 3, in order to determine the proper placement and tension of extension spring 76 when mechanism 38 is in its retracted position, as seen here.

It is also important to point out that as mechanism 38 moves from its retracted position in FIG. 3 to its fully deployed position in FIG. 4, extension springs 76 and 78 stretch. The increased tension in these two springs is necessary in the fully deployed position since the fabric structure 98 (shown in FIG. 1) must be held taut (as shown in FIG. 7).

As shown in FIGS. 3 and 4, the synergism of movement between the rotation of the crank arms 48 and 84 along with the horizontal thrust of connecting rods 62A and 62F, and their respective extension springs 76 and 78, provides a simple yet efficient means for alternately maintaining mechanism 38 in either its deployed or its retracted positions.

FABRIC STRUCTURE IN DETAIL—FIGS. 1,7,8, AND 9

Figure 7:
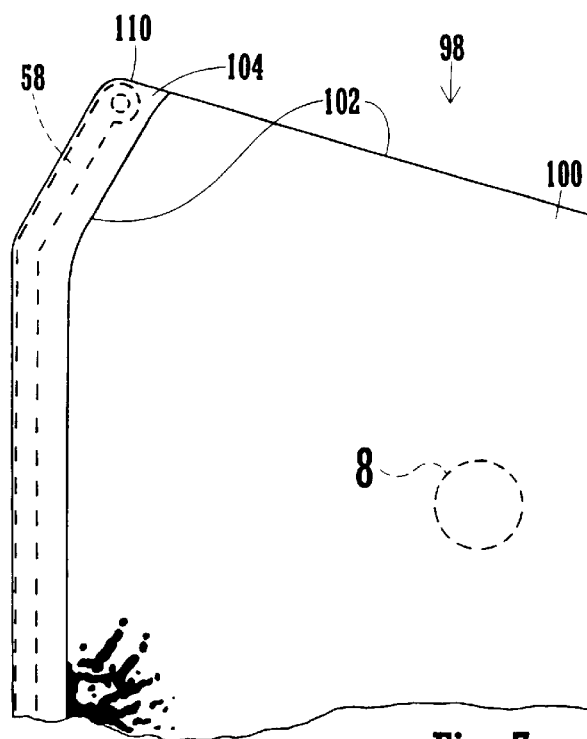
FIG. 7 is a partial side view of a fabric structure, including its one-ply mesh, as it would appear when stretched taut in the deployed position.

A partial view of the fully deployed fabric structure 98 is shown in FIG. 7 (side view) stretched taut over long arm 58 and short arm 74, which together serve as a fraiming device for fabric structure 98, are hidden within long sleeve 104 and short sleeve 106 respectively. The closed top end 110 of each sleeve prevents its top end from sliding down any further along its respective arm. Tie-down-cords 112 and 114 (shown in FIG. 1) are not visible in the partial view of FIG. 7.

Referring back to FIG. 1 reveals that the function of tie-downcords 112 and 114 is to keep sleeves 104 and 106, of fabric structure 98, from riding up arms 58 and 74 respectively. This is accomplished by tie-down-cord 112 being fastened, tied, or otherwise attached to arbor 44 at the base of arm 58 adjacent to collar 54. Tie-down cord 114 is fastened, tied, or otherwise attached to arbor 80 at the base of arm 74 adjacent to collar 72.

Elastic mesh 100 (shown in FIG. 7 and, more completely in FIG. 1) is a sheer one-ply sheet of fabric, bordered on all four sides by seam 102, which serves not only to reinforce it, but also to attach sleeves 104 and 106 onto its rear and front sides respectively. Sleeves 104 and 106 should be made from a tightly woven nylon fabric with construction emphisis on tear resistance and durability. Mesh 100 should be constructed from a combination of both nylon and spandex, giving it the ability to stretch well beyond its normally compact size, which can easily fit into a suitably small space. Variable ratios of nylon and spandex between 90% to 10% and 95% to 5% (the larger percentages being of nylon) will be sufficient but are by no means absolute specifications. Any nylon stocking company can provide access to materials and expertise in the making of mesh 100 with the required sheerness and elasticity.

Furthermore, fabric structure 98 should be black (or at least dark) in color, non-reflective, and without shimmer for best results. The only useful images of light to the driver are those coming from the opposite side of mesh 100. Any light source coming from the side of fabric structure 98 facing the driver (control panel lights, map lights, street lights, for instance), ideally, should not be reflected. This helps to insure that the image a driver will see in his/her exterior rear view mirror will not be unnecessarily distorted or blotted out by unwelcome reflections from extraneous light sources when using fabric structure 98 for viewing therethrough.

Figure 8:
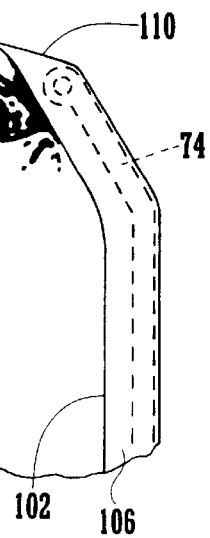
FIG. 8 is an enlarged or magnified section of the one-ply mesh which is indicated by the dashed-line-circle 8 in FIG. 7.

In FIG. 7, mesh 100 is stretched taut, and a small circular area 8 is delineated and then magnified in FIG. 8 to reveal individual strands 116 of nylon and spandex fabric. Between these individual strands 116 are numerous voids or holes 118 of even distribution.

Figure 9:
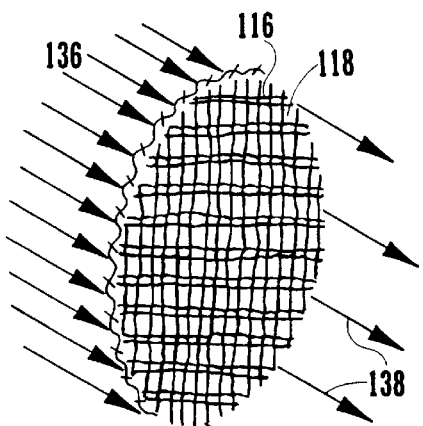
FIG. 9 is a perspective view of the same section previously shown in FIG. 8 in order to demonstrate its light transmittance characteristics.

FIG. 9 is a sectional view of FIG. 8 in perspective. This allows one to see light entering from behind the section, represented by twelve arrows 136, and light exiting on the opposite side of the section, represented by five arrows 138. This demonstrates that although some of the incoming light is allowed to pass evenly through the numerous voids 118, much of that light is blocked or diminished by the numerous strands 116 which are woven together to make up the mesh 100 (FIG. 7).

Mesh 100 (FIGS. 1 and 7) should be no less transparent than is necessary to attenuate glare from an automobile's headlights. This limiting factor forms the basis upon which the transparency of mesh 100 should be decided and this, in turn, will be largely determined by the number of holes 118 (FIGS. 8 and 9) it will have per linear centimeter.

Refering alternately between FIGS. 7 and 8, it is only relevant what the distribution of holes 118 (from FIG. 8) per linear centimeter is while mesh 100 (FIG. 7) is stretched sufficiently taut, as it would be in the deployed position. This number of holes 118 can not be given as an absolute number. Other variables, such as the thickness of strands 116 (FIG. 8), the over-all dimensions and elasticity of mesh 100, and the degree of tension placed upon it while deployed must first be factored in. However, for reference, a sufficiently sheer elastic one-ply mesh 100 will normally have between 15 and 25 holes 118 per linear centimeter of mesh 100 when it is stretched sufficiently taut.

The size of mesh 100, and subsequently the size of the entire antiglare screen device 18, should be made large enough, yet no larger than necessary, for it to totally encompass, when deployed, the perimeter of an automobile's exterior rear view mirror 144 (FIG. 15) within a driver's line-of-sight.

OPERATION—FIGS. 10 TO 17

Figure 10:
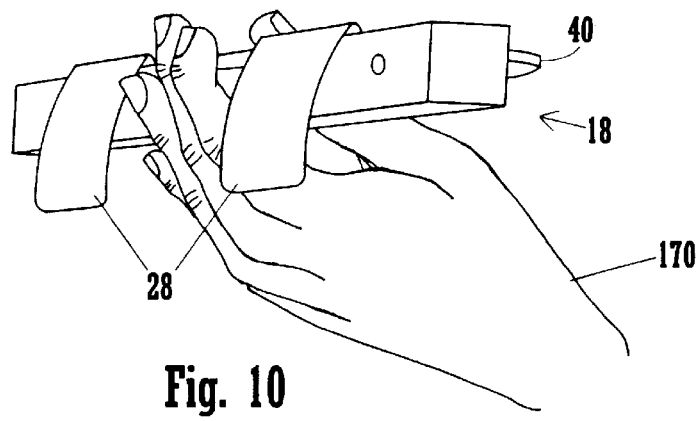
FIG. 10 is a perspective view of the antiglare screen device, according to the present invention, which is handheld in this view.

FIG. 10 shows the deployable antiglare screen device 18 can be held in one hand 170, and with the two mounting clips 28, it can also be installed easily and quickly with one hand 170. Hand lever 40 is shown on the opposite side to that of mounting clips 28 for its easy access.

Figure 11:
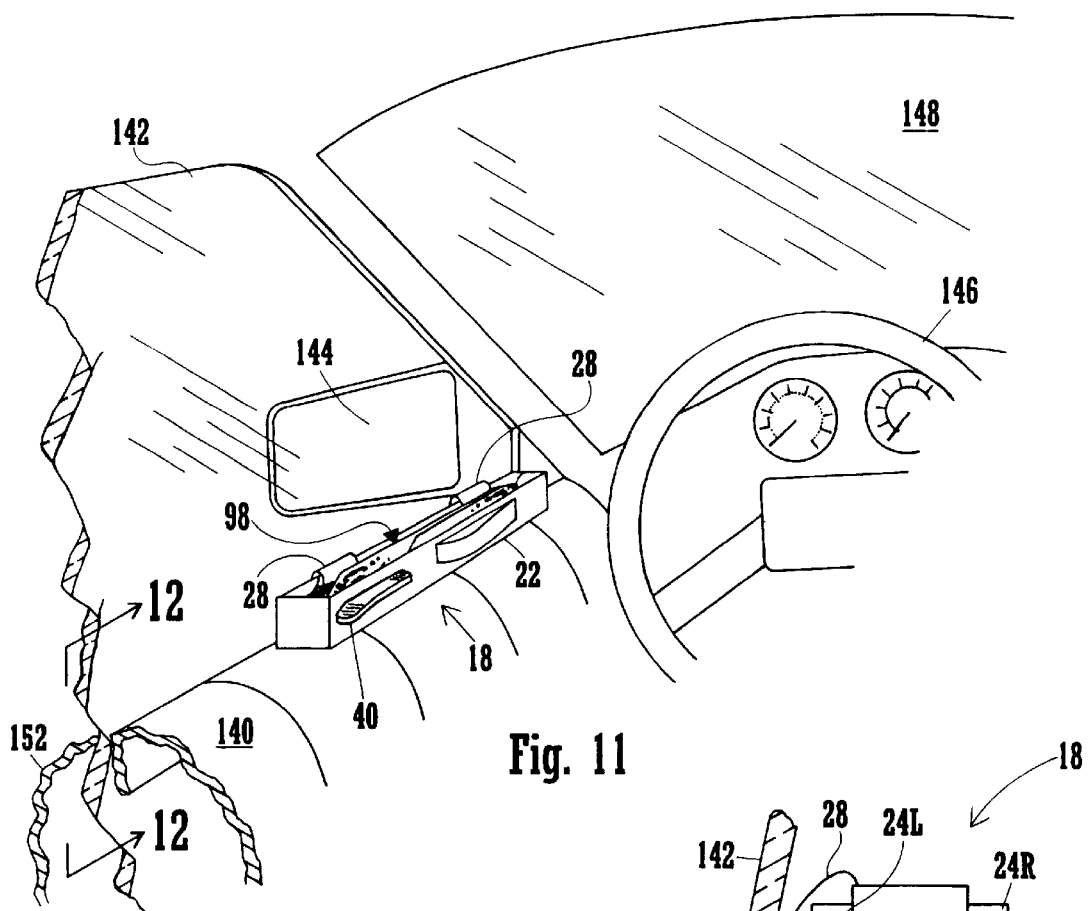
FIG. 11 is a partial perspective view of an automobile's interior, as seen from the vantage point of a driver, which includes the antiglare screen device, in its retracted position, mounted on a driver's side door.

FIG. 11 (in perspective) is a view from the interior of an automobile, from a driver's vantage point. The antiglare screen 18 is mounted on an inboard-side-of-driver's door 140, positioned adjacent a slidable window 142, opposite an exterior rear view mirror 144. When properly positioned, the retracted antiglare screen device 18 is directly under driver's line-of-sight of his/her exterior rear view mirror. A steering wheel 146 and a windshield 148 are included in this view for positional referencing of antiglare screen device 18 when it is properly installed.

The housing 22 is situated so that handle 40 is in its rear section, on the side facing the driver, while the two mounting clips 28 will be facing outward, adjacent the slidable window 142 which should be in the rolled-up position as pictured. Fabric structure 98 is visible through the open top of housing 22, but tucked down inside of it and secure. This is how the antiglare screen 18 appears in its retracted position. An exterior-side-of-driver's-door 152 is provided as a more complete reference for a sectional view indicated by line 12—12 which represents FIG. 12.

Figure 12:
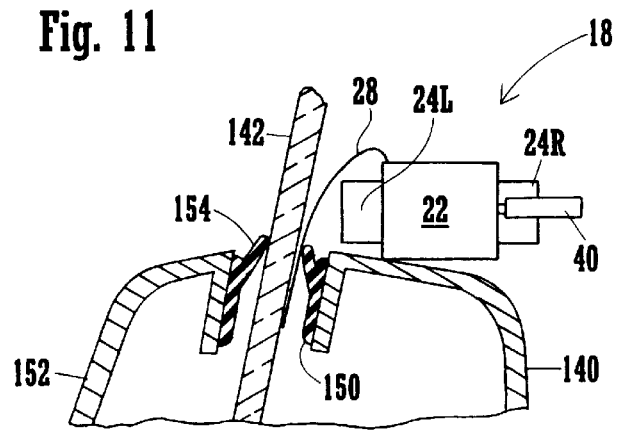
FIG. 12 is a sectional view taken along line 12—12 of FIG. 11 and shows an orthongonal view, from the rear, of the present invention and how it is mounted on the driver's side door.

FIG. 12 is an orthogonal cross-section view from directly behind the antiglare screen device 18, looking forward. The exterior-side-of-driver's-door 152 along with its fixedly attached elastomeric exterior window seal 154 are included here for reference. The housing 22 sits atop the inboard-side-of-door 140 and is held in place by simply wedging the two mounting clips 28 between the slidable window 142 and an elastomeric interior window seal 150, fixedly attached to the inboard-side-of-door 140 and adjacent the interior side of slidable window 142. Notice how the mounting clips 28 extend out beyond the outside edge of left nacelle 24L. This is proper placement of the antiglare screen device 18 as the housing 22 should be approximately level, and not come into direct contact with drivers side window 142. On the opposite side of housing 22, right nacelle 24R is visible but well out of the way. Hand lever 40 extends outward to allow for an easy and solid grasp, as shown in FIG. 13.

Figure 13:
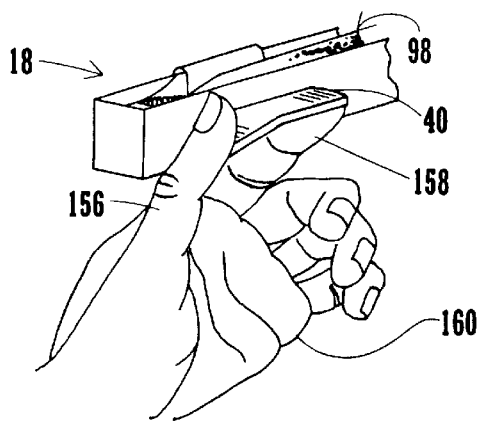
FIG. 13 is a partial perspective view of a rear portion of the present invention, from the driver's vantage point, demonstrating how the driver should engage the antiglare screen device using his/her left hand.

FIG. 13 is a partial perspective view from a drivers vantage point and shows antiglare screen 18 in its normally retracted position, with fabric structure 98 folded down and hand lever 40 in its horizontal position. To deploy, driver should reach up, from underneath, with left hand 160, and in an under-handed fashion, grasp hand lever 40 by putting the thumb 156 on top of the back end of hand lever 40, and the index finger 158 under the front end of hand lever 40. Push down with thumb 156 and up with index finger 158.

Figure 14:
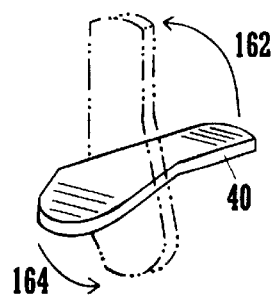
FIG. 14 is a perspective view of a hand lever and shows how it moves, when engaged, to deploy the present invention from a retracted position.

As shown in FIG. 14, this will rotate the front of hand lever 40 up and back as shown by arrow 162. At the same time, the back end of hand lever 40 will rotate down and forward, indicated by arrow 164. The end result will be that the hand lever 40 will have been rotated approximately one quarter turn, or 90° of arc, from its horizontal position to its vertical position, as shown in FIG. 14.

Figure 15:
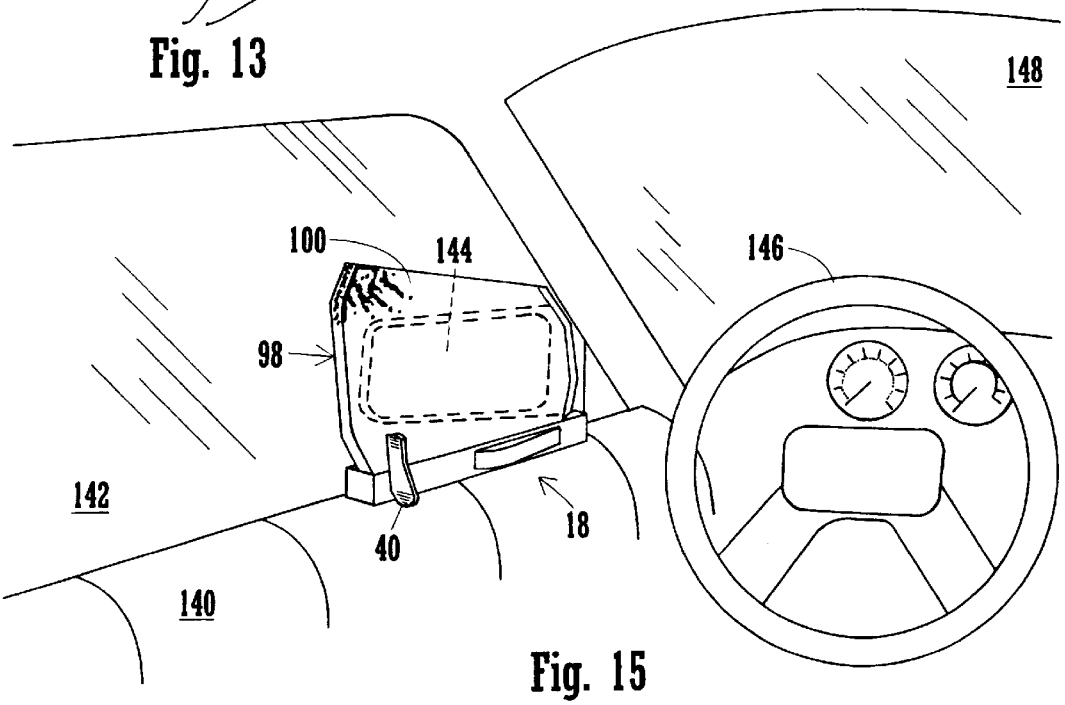
FIG. 15 is a partial perspective view of an automobile's interior, as seen from the vantage point of a driver. Mounted on the driver's door is the antiglare screen device with its fabric structure fully deployed and completely encompassing the driver's view of his/her exterior rear view mirror.

FIG. 15 is a perspective view from the vantage point of a driver seated within an automobile's interior. Features such as the steering wheel 146 and windshield 148 help to make this position evident. The antiglare screen device 18 is mounted on top of the inboard-side-of-driver's-door 140. Hand lever 40 in a vertical position means that the fabric structure 98 is deployed and if the antiglare screen device 18 has been properly pre-positioned, the elastic mesh 100 will completely enshroud the view of exterior rear-view-mirror 144, as seen by the driver of the vehicle. Keep in mind that mesh 100 will not block the view, as some light will still pass through, allowing the driver to see a less-bright view of headlights reflected from exterior rear view mirror 144. The slidable window 142 should be rolled up as shown, to provide optimum conditions for using the antiglare screen device 18, although cracking the window for ventilation shouldn't hamper its operation. Remember that, as seen in FIG. 12, mounting clips 28 are in direct contact with the slidable side window 142. Rolling this slidable window 142 up and down may move mounting clips 28, and thus move the entire antiglare screen device 18 out of its proper position.

When the antiglare screen device 18 is deployed to cut the glare from a trailing vehicle's headlights, it is usually needed only for a short time. When the offending headlights producing the glare move out of a driver's field of vision, he/she may quickly and easily retract elastic mesh 100 to allow a normal untreated view of the image reflected into his/her exterior rear view mirror 144.

Figure 16:
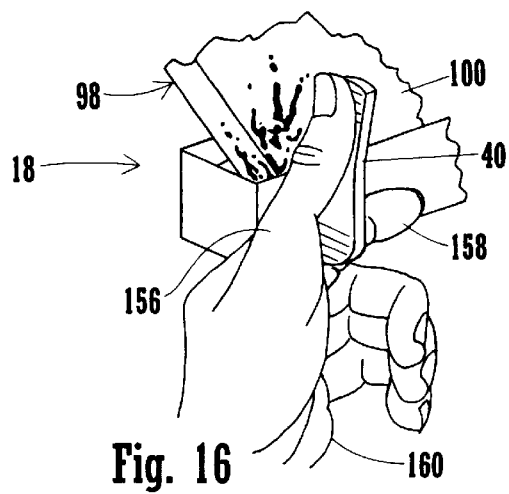
FIG. 16 is a partial perspective view of a rear portion of the present invention from the driver's vantage point and demonstrates how the driver should disengage the antiglare screen by using his/her left hand.

FIG. 16 (a partial perspective view) shows the antiglare screen device 18 with fabric structure 98 fully deployed and mesh 100 stretched taut. In this fully deployed position, hand lever 40 is oriented vertically. To retract the antiglare screen 18, the driver uses his/her left hand 160 to grasp the hand lever 40 from underneath. Hooking the index finger 158 around the bottom of hand lever 40 to move it backwards, while at the same time pushing against the top of hand lever 40 with the thumb 156, results in hand lever 40 rotating as shown in FIG. 17.

Figure 17:
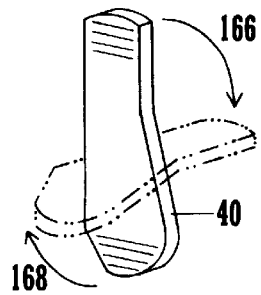
FIG. 17 is a perspective view of the hand lever and shows how it moves, when disengaged from the deployed position, back to the retracted position.

FIG. 17 shows how the top of hand lever 40 rotates forward and down, as shown by arrow 166, and the bottom end moves back and up, as shown by arrow 168. This is a one quarter turn, or approximately 90° of arc, moving the hand lever 40 from its vertical position, back down to its horizontal position. This action brings the antiglare screen device 18 back to its retracted position, as previously shown in FIG. 11.

CONCLUSION, RAMIFICATIONS, AND SCOPE OF INVENTION

Thus the reader will see that the antiglare screen device of this invention can be easily installed on a driver's door within the passenger section of an automobile and used by the driver to attenuate glare, reflected in his/her exterior rear view mirror, from the bright headlights of a trailing vehicle. Further, the driver may choose from moment to moment whether to have the antiglare screen device in a deployed position, to diminish glare, or whether to retract it to allow the normal untreated view from the exterior rear view mirror.

In addition, engaging the antiglare screen device to deploy or disengaging it to retract only takes one quick and simple movement, using one hand. This manual operation will not distract the drivers attention from the road. The device may also be quickly removed from the door and stowed during the day or transferred to another vehicle.

Furthermore, the antiglare screen device has the additional advantages in that it permits a manufacturer the ability to produce an inexpensive product that can be distributed directly to the public as an after-market item, providing wide access to it.

it permits a quick and easy installation, within seconds by the individual purchaser without the aid of a mechanic or service specialist, allowing the consumer to put it into immediate use right off the retailers shelf.

it permits the driver to adapt instantly to the changing light conditions of the surrounding traffic from moment to moment. The driver has an option to deploy or retract the antiglare screen device at will and can exercise that option easily, without distraction, while driving.

While my above description contains many specificities, these should not be construed as limitations on the scope of the invention, but rather as an exemplification of one preferred embodiment there of. Many other variations are possible. For example:

The corners of the housing can be more rounded and/or fitted with a padding, such as a thin rubber layer, to lower the chances of personal injury in the event of a car accident.

The housing can be made from a variety of materials such as metal alloys, in addition to polymers. Reinforcing metal eyelets can be used around the holes of the housing at the mechanism's contact points, to support the stresses of the arbors and the mounting bolt for the bell crank.

The mechanism may be made of a uniform metal or polymer, allowing for components like master rotation device 42M and slave rotation device 42S to be molded integrally. On the other hand, the mechanisms individual parts can be made in sections (modular) and formed from a variety of metals, aluminum alloys, or polymers in order to vary the ductility and rigidity of those individual parts before assembly. More likely, a combination of these two methods may be employed to achieve a desired outcome in product quality and cost effectiveness.

The antiglare screen device can be varied in shape and/or given a more ergonomic design which appeals to the upscale tastes of modern consumer, as long as its operation is not hampered.

Dimensions of the antiglare screen device, in general, can be varied to fit particular vehicles and various sizes of exterior rear view mirrors.

The bellcrank could be mounted sideways, on a horizontal bolt and bushing, to rotate on a vertical plain instead of the horizontal plain shown in the present embodiment.

One spring, instead of two, may be adequate providing it has a high enough tension rating. Also, varying materials (heavy duty rubber bands, bungy cables, etc.) may be substituted for the extension springs.

The invention can also be designed for a passenger's use, simply by switching the mounting clips and the hand lever to opposite sides of the housing from that which is shown in the preferred embodiment. In this way the present invention could also be used in countries where right-hand-drive vehicles are the norm.

The invention may come equipped with means to allow for a more permanent mounting to the drivers door. For instance, hook and loop fastners can be applyed to both the base of the antiglare screen device and to the upper door end, adjacent the base, for a more secure mounting.

Although the preferred color is black, the antiglare screen device may come in a variety of colors, provided those colors are as non-reflective as possible. Deep, dark colors are preferable for the fabric structure, while some brighter colors may be applied to the base unit if desired.

A full top cover for the housing could be provided which is operated (opened and closed) by the same lever which deploys and retracts the mechanism and its fixedly attached fabric structure.

The one-ply mesh could be made of varying sheerness to alter its light transmitance and additional tie-down-cords may be added along the lower end of its length, attaching to the housing, to keep it vertically taut when deployed.

Accordingly, the scope of the invention should be determined not by the embodiment illustrated, but by the appended claims and their legal equivalents.

I claim:

1. A deployable antiglare screen device for use in automobiles equipped with an exterior rear view mirror mounted on a side door having both an inboard and exterior side and a vertically slidable window, said deployable antiglare screen device comprising:

(a) a base having a housing and a means for detachably mounting said housing onto the upper end of said inboard side of said door of said automobile adjacent to the lower front corner of said slidable window opposite said exterior rear view mirror;

(b) a collapsible mesh screen which, when spead out, reduces glare from bright light when viewing therethrough;

(c) a mechanism mounted within said housing and having a fixedly attached collapsible framework device which can be alternately retracted or deployed for moving said mesh screen respectively from a folded down position within said housing to a spread out position with sufficient size and shape, when properly placed, to totally encompass an area the perimeter of a driver's view of the entire of said exterior rear view mirror;

whereby said deployable antiglare screen device, when properly prepositioned on said door, can be engaged by the driver of a vehicle to instantly deploy a mesh screen within the driver's line-of-sight of said exterior rear view mirror to attenuate reflected glare from any bright light source and whereby driver can instantly disengage the deployable antiglare screen device to retract said mesh screen back into its said housing for storage so driver can see a regular untreated view of the reflected image in said exterior rear view mirror, and whereby the deployable antiglare screen device will lie-in-wait out of driver's way, with no obstruction to driver's field of view, until such time as driver once again encounters glare reflected into said exterior rear view mirror.

2. The deployable antiglare screen device of claim 1, further including:

(a) mesh attaching means for attaching said mesh to said collapsible framework device of said mechanism for folding and storing said mesh inside housing or alternately spreading and suspending said mesh within drivers line of sight of said exterior rearview mirror;

(b) means to mount said mechanism securely within said housing while allowing for free rotational movement of said mechanism;

(c) engaging means connected to said mechanism and extruding from said housing for manual access to provide transfer of a bidirectional force from manual manipulation of said engaging means to said mechanism for urging said mechanism and its integral said framework device into a deployed or a retracted position;

(d) in combination, said mechanism having a tension means in contact with a bidirectional holding means for transmitting force from said tension means to said mechanism in two opposite directions at alternate times for the purpose of alternately holding said mechanism and its integrally attached said framework device in either a retracted or a fully deployed position.

3. The deployable antiglare screen device of claim 1 wherein said antiglare screen device is portable and interchangeable between a multitude of automobiles, and wherein said means for detachably mounting said housing is at least one mounting clip, fixedly attached to said housing, which can be wedged between the interior side of said slidable window and an adjacent interior window seal, integral to said inboard side of door, to be held in place by friction and gravity.

4. The deployable antiglare screen device of claim 3 wherein each of said at least one mounting clip has a substantially anticlinal shape with two individual flanks culminating into an apex.

5. The deployable antiglare screen device of claim 4 wherein each of said at least one mounting clip contacts the side of said housing whose exterior is facing said slidable window and in which one of said flanks of said at least one mounting clip conforms and attaches to said housing while the other of said flanks of said at least one mounting clip arches out and away from the exterior of said side of said housing so that it contacts the interior side of said slidable window nearly parallel when adjacent said interior window seal and has sufficient length to extend below said interior window seal inside said door to hold the antiglare screen device stable and sufficiently level.

6. The deployable antiglare screen device of claim 5 wherein:

(a) each of said at least one mounting clip has smooth edges and rounded end corners on the lower end for easy insertion between said slidable window and said interior window seal;

(b) each of said at least one mounting clip has a textured surface adjacent to and facing said interior window seal for providing adequate frictional force to keep each of said at least one mounting clip stable and in position.

7. The deployable antiglare screen device of claim 2 wherein said collapsible mesh screen is made from a flexible material with elastic properties to allow it to be stretched substantially beyond its original relaxed size.

8. The deployable antiglare screen device of claim 7 wherein said tension means is at least one spring, said bidirectional holding means is at least one crank arm, and said collapsible framework device comprises a duality of elongated support members and wherein said mechanism further includes:

(a) a duality of arbors pivotably mounted along their transversal axes positioned distally and in opposition to each other on opposite ends of said housing;

(b) a coupling means for movably coupling together said duality of arbors for providing synchronous movement from one of said arbors to the other thereof;

(c) a joining means for joining each of said elongated support members perpendicularly to the pivotal axis of a respective one of said arbors.

9. The deployable antiglare screen device of claim 8 wherein:

(a) a respective one of said crank arms is integrally connected to a respective one of said arbors; and (b) said coupling means comprises a pivotably mounted bell crank which is sandwiched between and movably adjoined to a duality of connecting rods, each of which are pivotably adjoined by a linking means on their outer ends to a respective one of said arbors;

(c) each one of said connecting rods has a spring attachment for holding one end of a respective one of said springs in place;

(d) each one of said springs is hooked on one of its ends to a respective one of said crank arms and hooked on the other end to a respective one of said spring attachements of a respective one of said connecting rods wherein:

(1) each one of said springs is caused to stretch and increase in tension as said mechanism is moved from a retracted position to its deployed position;

(2) each one of said springs applies more tension to said mechanism in its deployed position than in its retracted position;

(3) said increase in tension is sufficient to hold said mesh screen tautly stretched in its deployed position;

(e) said engaging means is a hand level fixedly attached to one of said arbors of said mechanism for transmitting a rotational force from a person's hand to said arbor for moving said mechanism between its retracted and deployed positions;

(f) said duality of elongated support members comprise:

(1) a rear arm which has enough vertical height, when deployed, to suspend the upper end of said mesh screen to at least as high as the upper perimeter of said exterior rear view mirror when said antiglare screen device is properly positioned;

(2) a front arm which is sufficiently shorter, when vertically deployed, than said rear arm so as to allow it to fit adequately close to the lower front wedge-shape of said vertically slidable window and yet of enough vertical height to suspend the upper end of said mesh to at least as high as the upper perimeter of said exterior rear view mirror;

(g) whereby said duality of elongated support members:

(1) when retracted are in a prone position lying head-to-toe, side by side, and parallel to each other oriented longitudinally within said housing;

(2) when deployed are substantially vertical and in opposition to each other;

(3) each describe an individual arc which sweeps substantially 90° between its retracted and deployed positions;

(4) are arranged and sufficiently spaced to avoid contacting with each other during operation;

whereby each of said springs will increase in tension as said mechanism moves from its retracted position to its fully deployed position, and whereby said increased spring tension is applied to said mechanism and its associated said elongated support members, and whereby said elongated support members, of said mechanism, will exert sufficient force to hold said mesh screen tautly stretched when said mechanism is in the fully deployed position.

10. The deployable antiglare screen device of claim 8 wherein said mesh attaching means is a duality of sleeves attached to and sandwiching said mesh screen, one respectively on each of its front and rear ends, for fitting around a respective one of each said elongated support members.

11. The deployable antiglare screen device of claim 10 wherein a plurality of tie-down cords are used:
   (a) to attach each of said sleeves to its respective said arbor in order to keep each of said sleeves securely in place around its respective said elongated support member;
   (b) to attach the lower end of said mesh to said housing along its length, at predetermined placements around said mechanism, for keeping said mesh vertically taut when deployed.

12. The deployable antiglare screen device of claim 1 wherein said mesh screen has numerous threads, with elastic properties, woven together at regularly spaced intervals to allow an evenly distributed pattern of voids throughout said mesh which when stretched sufficiently taut will allow an adequit amount of light for viewing objects therethrough, while said woven threads block out a sufficient amount of said light to effectively cut its intensity and prevent glare from a light source when viewing therethrough.

13. The deployable antiglare screen device of claim 12 wherein said mesh screen is sufficiently dark in color, non-reflective, and without shimmer so as to reduce any chance of reflectivity on the interior side of said mesh facing the driver and any other occupants of said automobile.

14. A method for reducing bright light glare reflecting from an exterior rear view mirror of an automobile into the eyes of a driver of said automobile using a deployable antiglare screen device, comprising:
   (a) providing a base having a housing and a means for detachably mounting said housing onto the upper end of an inboard side of said door of said automobile adjacent to the lower front corner of said window opposite said exterior rear view mirror;
   (b) providing a collapsible mesh screen which, when spread out, reduces glare from bright light when viewing therethrough;
   (c) providing a mechanism mounted within said housing and having a fixedly attached collapsible framework device which can be alternately retracted or deployed for moving said mesh screen respectively from a folded down position within said housing to a spread out position with sufficient size and shape, when properly placed, to totally encompass an area the perimeter of said driver's view of the entire of said exterior rear view mirror;

whereby said deployable antiglare screen device, when properly prepositioned on said door, can be engaged by the driver of a vehicle to instantly deploy a mesh screen within the driver's line-of-sight of said exterior rear view mirror to attenuate reflected glare from any bright light source and whereby driver can instantly disengage the antiglare screen device to retract said mesh screen back into its said housing for storage so driver can see an untreated regular view of said exterior rear view mirror, and whereby the antiglare screen device will lie-in-wait perched upon said inboard side of door, out of driver's way with no obstruction to driver's field of view, until such time as driver once again encounters glare reflected into said exterior rear view mirror.

15. The method for reducing bright light glare of claim 14, further comprising:
   (a) providing a means for attaching said mesh to said collapsible framework device of said mechanism for folding and storing said mesh inside housing or alternately spreading and suspending said mesh within driver's line-of-sight of said exerior rearview mirror;
   (b) providing a means to mount said mechanism securely within said housing which allows for free rotational movement of said mechanism;
   (c) providing an engaging means connected to said mechanism and extruding from said housing for manual access to provide transfer of a bidirectional force from manual manipulation of said engaging means to said mechanism for urging said mechanism and its integral said framework device into a deployed or a retracted position;
   (d) providing a tension means in contact with a bidirectional holding means for transmitting force from said tension means to said mechanism in two opposite directions at alternate times for the purpose of alternately holding said mechanism and its integrally attached said framework device in either a retracted or a fully deployed position.

* * * * *